US012579294B2

(12) United States Patent
Maikhuri et al.

(10) Patent No.: US 12,579,294 B2
(45) Date of Patent: Mar. 17, 2026

(54) SMART ASSURANCE FOR ENTERPRISE-WIDE SENSITIVE DATA

(71) Applicant: Dell Products L.P., Round Rock, TX (US)

(72) Inventors: Ajay Maikhuri, Bangalore (IN); Vibha Pandey, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 144 days.

(21) Appl. No.: 18/541,569

(22) Filed: Dec. 15, 2023

(65) Prior Publication Data

US 2025/0200204 A1 Jun. 19, 2025

(51) Int. Cl.
| | |
|---|---|
| *G06F 21/62* | (2013.01) |
| *G06F 16/9035* | (2019.01) |
| *G06F 16/907* | (2019.01) |
| *G06F 16/78* | (2019.01) |
| *G11C 25/00* | (2006.01) |

(52) U.S. Cl.
CPC ................................ *G06F 21/6218* (2013.01)

(58) Field of Classification Search
None
See application file for complete search history.

(56) References Cited

U.S. PATENT DOCUMENTS

| | | | |
|---|---|---|---|
| 11,599,667 B1 * | 3/2023 | Tutuianu .................. | G06N 5/04 |
| 11,797,705 B1 * | 10/2023 | Voinea ................ | G06F 21/6245 |
| 12,223,704 B2 * | 2/2025 | Su .......................... | G06N 3/0464 |
| 2013/0159021 A1 * | 6/2013 | Felsher .................. | G16H 10/60 |
| | | | 705/3 |
| 2019/0012441 A1 * | 1/2019 | Tuli .......................... | G06N 3/02 |
| 2020/0012892 A1 * | 1/2020 | Goodsitt .............. | G06V 10/993 |
| 2022/0215248 A1 * | 7/2022 | Ramirez ................ | G06N 3/006 |
| 2022/0224508 A1 * | 7/2022 | Sirdey .................... | G06N 3/088 |
| 2022/0386067 A1 * | 12/2022 | Donaire ................ | H04W 4/021 |

* cited by examiner

*Primary Examiner* — Venkat Perungavoor

(74) *Attorney, Agent, or Firm* — Daly, Crowley, Mofford & Durkee, LLP

(57) ABSTRACT

A method for evaluating data compliance with sensitivity policies is disclosed. The method involves receiving a user input that specifies a data category and searching a network to identify multiple databases. Data objects stored within those databases are identified, and a distinct signature is generated for each data object. A neural network is used to classify the signatures to determine which data objects contain information associated with the specified data category. For those identified data objects, the method detects whether the data complies with applicable sensitivity policies. Alerts are generated for any data objects that match the data category but fail to meet the sensitivity requirements.

10 Claims, 6 Drawing Sheets

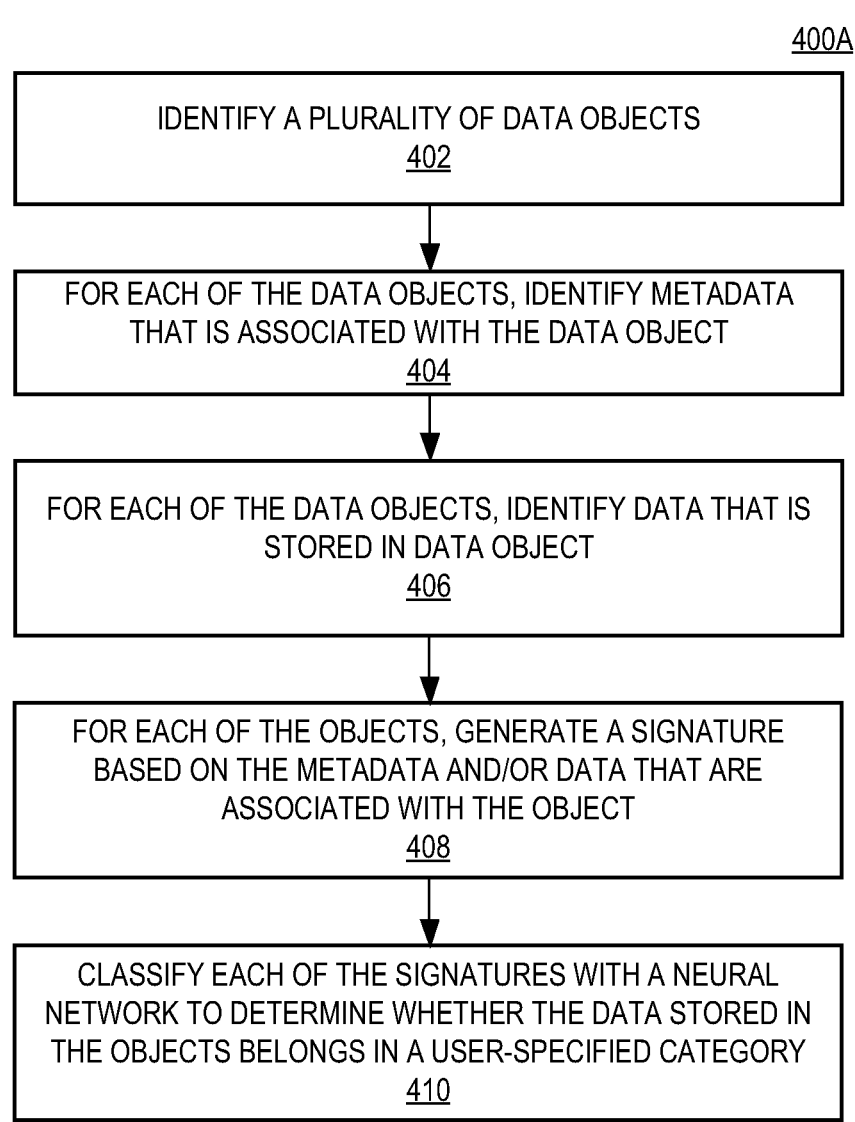

400A

IDENTIFY A PLURALITY OF DATA OBJECTS
402

FOR EACH OF THE DATA OBJECTS, IDENTIFY METADATA
THAT IS ASSOCIATED WITH THE DATA OBJECT
404

FOR EACH OF THE DATA OBJECTS, IDENTIFY DATA THAT IS
STORED IN DATA OBJECT
406

FOR EACH OF THE OBJECTS, GENERATE A SIGNATURE
BASED ON THE METADATA AND/OR DATA THAT ARE
ASSOCIATED WITH THE OBJECT
408

CLASSIFY EACH OF THE SIGNATURES WITH A NEURAL
NETWORK TO DETERMINE WHETHER THE DATA STORED IN
THE OBJECTS BELONGS IN A USER-SPECIFIED CATEGORY
410

FIG. 4A

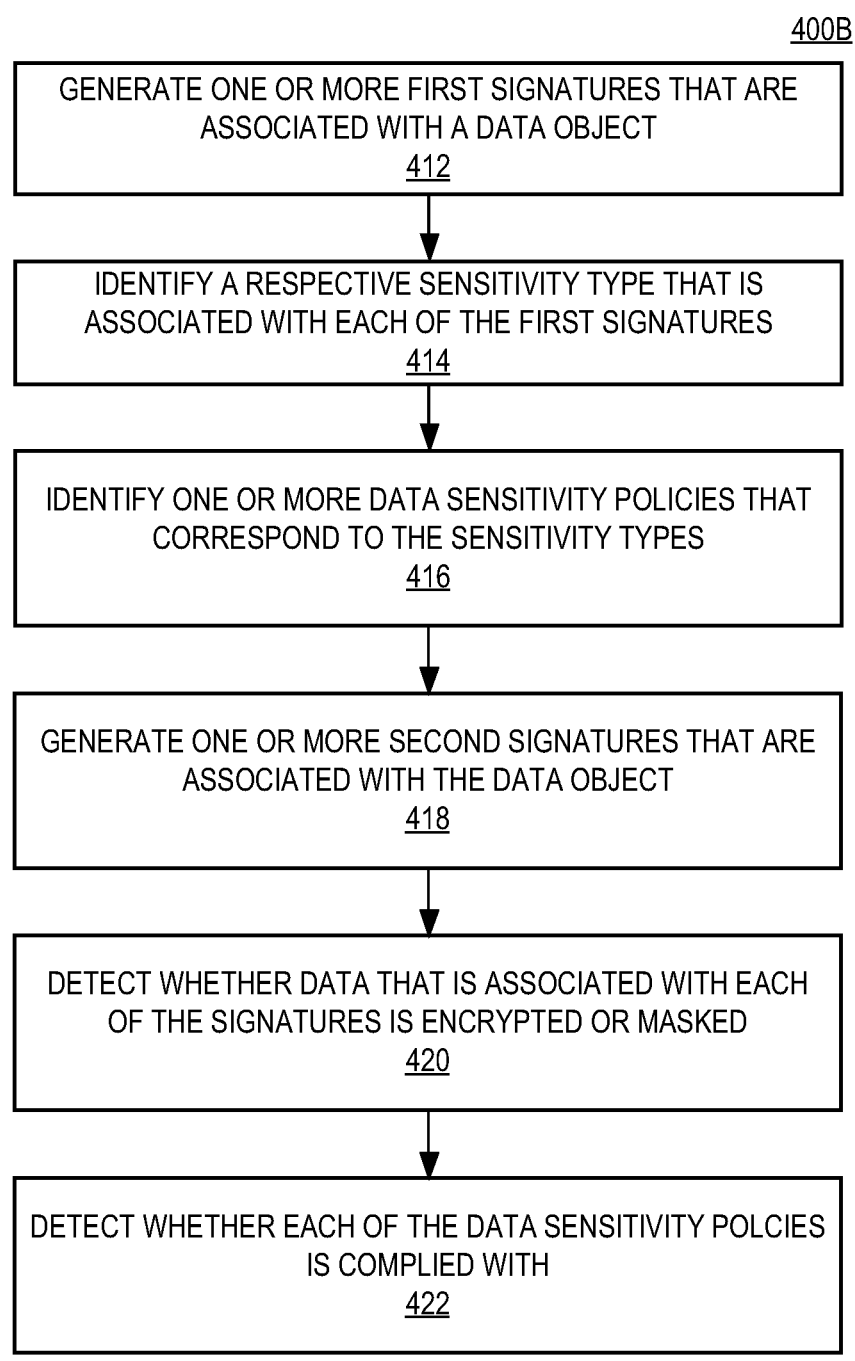

400B

GENERATE ONE OR MORE FIRST SIGNATURES THAT ARE
ASSOCIATED WITH A DATA OBJECT
412

IDENTIFY A RESPECTIVE SENSITIVITY TYPE THAT IS
ASSOCIATED WITH EACH OF THE FIRST SIGNATURES
414

IDENTIFY ONE OR MORE DATA SENSITIVITY POLICIES THAT
CORRESPOND TO THE SENSITIVITY TYPES
416

GENERATE ONE OR MORE SECOND SIGNATURES THAT ARE
ASSOCIATED WITH THE DATA OBJECT
418

DETECT WHETHER DATA THAT IS ASSOCIATED WITH EACH
OF THE SIGNATURES IS ENCRYPTED OR MASKED
420

DETECT WHETHER EACH OF THE DATA SENSITIVITY POLCIES
IS COMPLIED WITH
422

FIG. 4B

SMART ASSURANCE FOR
ENTERPRISE-WIDE SENSITIVE DATA

BACKGROUND

Compliance with data protection regulations is of paramount importance in today's digital landscape, where the collection, processing, and storage of personal information have become ubiquitous. These regulations, such as the General Data Protection Regulation (GDPR) and others globally, serve as a safeguard, ensuring that individuals' sensitive data is handled with the utmost care and responsibility. Adhering to these regulations not only protects the privacy rights of individuals but also fosters trust between businesses and their customers. It mitigates the risk of data breaches, identity theft, and unauthorized access, which can have severe consequences for both individuals and organizations. Moreover, compliance enhances the overall integrity of data management practices, promoting transparency and accountability. As technology continues to advance, the significance of data protection regulations becomes increasingly critical to maintaining a secure and ethical digital environment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided, comprising: receiving a user input specifying a data category; performing a search of a network to identify a plurality of databases in the network; identifying a plurality of data objects that are stored in the plurality of databases; generating a different respective first signature for each of the plurality of data objects; classifying the respective first signature for each of the plurality of data objects with a neural network, and identifying, as a result of the classifying, those of the plurality of data objects that contain data that falls into the data category; detecting whether each of the data objects, which contain data that falls in the data category, complies with one or more data sensitivity policies; and generating an alert for any of data objects that contain data that falls into the data category, but fail to comply with the data sensitivity policies.

According to aspects of the disclosure, a system is provided, comprising: a memory; and at least one processor that is operatively coupled to the memory, the at least one processor being configured to perform the operations of: receiving a user input specifying a data category; performing a search of a network to identify a plurality of databases in the network; identifying a plurality of data objects that are stored in the plurality of databases; generating a different respective first signature for each of the plurality of data objects; classifying the respective first signature for each of the plurality of data objects with a neural network, and identifying, as a result of the classifying, those of the plurality of data objects that contain data that falls into the data category; detecting whether each of the data objects, which contain data that falls in the data category, complies with one or more data sensitivity policies; and generating an alert for any of data objects that contain data that falls into the data category, but fail to comply with the data sensitivity policies.

According to aspects of the disclosure, a non-transitory computer-readable medium is provided that stores one or more processor-executable instructions, which, when executed by one or more processors, cause the one or more processors to perform the operations of: receiving a user input specifying a data category; performing a search of a network to identify a plurality of databases in the network; identifying a plurality of data objects that are stored in the plurality of databases; generating a different respective first signature for each of the plurality of data objects; classifying the respective first signature for each of the plurality of data objects with a neural network, and identifying, as a result of the classifying, those of the plurality of data objects that contain data that falls into the data category; detecting whether each of the data objects, which contain data that falls in the data category, complies with one or more data sensitivity policies; and generating an alert for any of data objects that contain data that falls into the data category, but fail to comply with the data sensitivity policies.

BRIEF DESCRIPTION OF THE DRAWING
FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 4A is a flowchart of an example of a process, according to aspects of the disclosure;

FIG. 4B is a flowchart of an example of a process, according to aspects of the disclosure.

DETAILED DESCRIPTION

Figure 1:
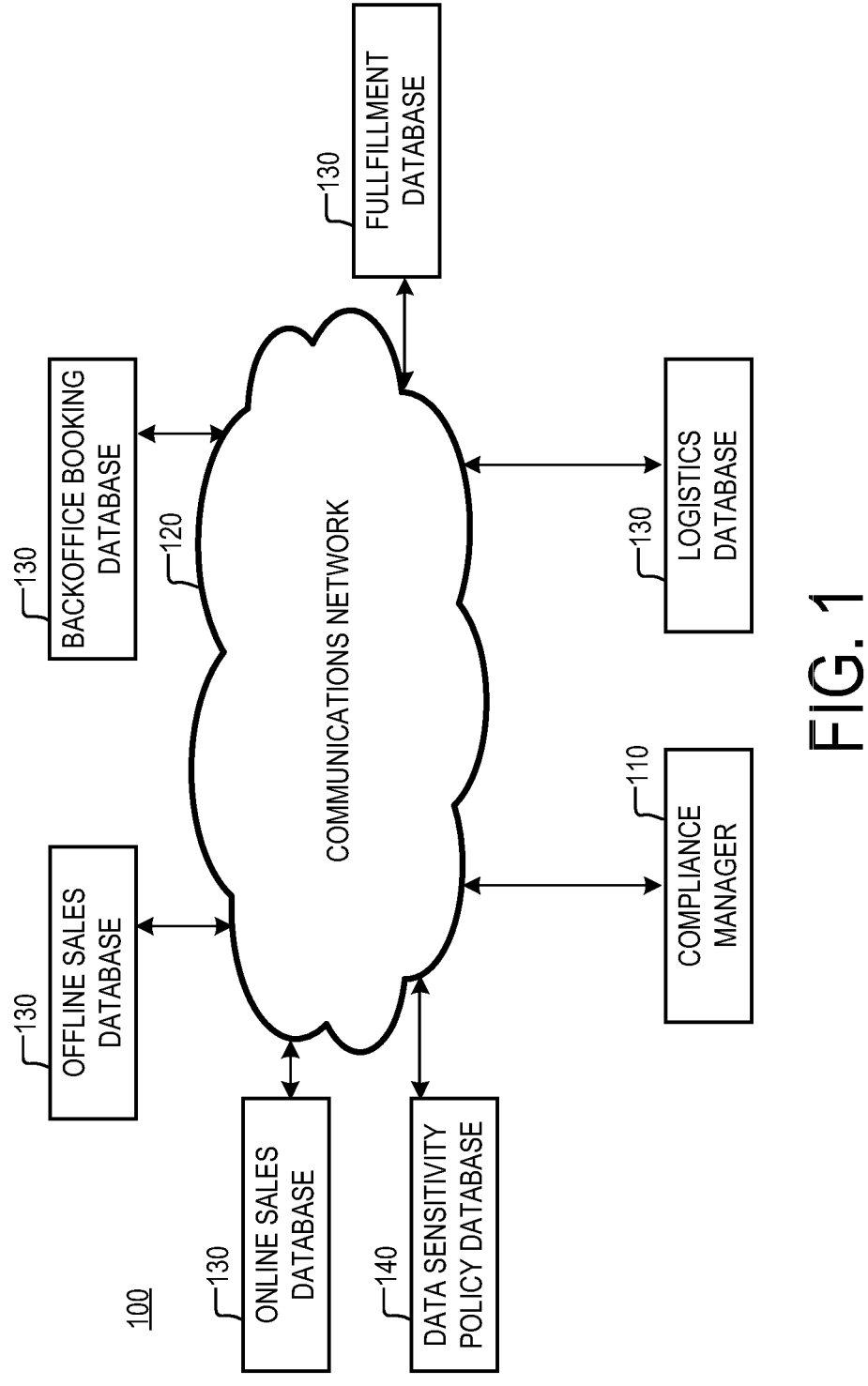
FIG. 1 is a diagram of an example of a system, according to aspects of the disclosure.

The digital era has revolutionized the use of data, turning it into a valuable commodity for extracting information and identifying trends. Organizations utilize customer data to provide personalized services and gain insights into future patterns. However, as the importance of data grows, data privacy has emerged as a significant challenge.

In today's enterprise landscape, organizations duplicate and distribute data across multiple downstream databases to support various business processes and maintain a comprehensive historical dataset for analytics and insights. This practice introduces challenges when it comes to ensuring compliance with regulations such as the General Data Protection Regulation (GDPR).

Validating compliance across multiple databases becomes complex, requiring assessments of factors like data masking, encryption, data minimization, consent management, and overall security and privacy measures in each downstream database. Due to the distributed nature of data and the complexities of organizational systems, ensuring compliance involves comprehensive monitoring, coordination, and regular audits to protect personal and sensitive data according to legal and regulatory requirements.

The General Data Protection Regulation (GDPR) grants regulatory authorities the power to levy fines for non-compliance, with the potential for severe violations to incur maximum penalties of up to €20 million or 4% of a company's global annual turnover. Noteworthy cases from 2019, such as Google (fined €50 million), British Airways (£20 million), and Marriott International (£18.4 million), highlight the significant fines imposed due to breaches and infringements of data protection regulations.

To address these challenges, organizations can establish robust compliance mechanisms to mitigate data privacy risks and ensure adequate protection of customer data across downstream databases. The current tools in the market either propose an organization-wide centralized approach to handling sensitive information, which entails significant changes for existing large organizations, or they simply offer mechanisms to identify sensitive data in various sources. However, these tools lack the ability to map data flow paths, provide data masking facilities, offer a unified view of sensitive data across multiple sources, and generate compliance reports at the database level.

According to aspects of the disclosure, a compliance manager is provided that helps meet compliance demands at both the entity and attribute levels within downstream systems. To confirm compliance with various data protection rules or regulations, the compliance manager uses automated lineage that is determined using advanced machine learning techniques. The compliance manager may empower organizations with centralized control and monitoring capabilities, enabling them to maintain a steadfast commitment to regulatory standards. By mitigating the risks associated with data breaches, unauthorized access, and privacy issues, the compliance manager may be used to enhance transparency and reinforce compliance across the entire data flow of an organization. Additionally, the system compliance manager may be used to fulfil Data Subject Requests (DSRs) efficiently and effectively (e.g., by determining which data is acceptable to be shared and which is not).

FIG. 1 is a diagram of an example of a system 100, according to aspects of the disclosure. As illustrated, system 100 may include a compliance manager 110, a plurality of databases 130, and a data sensitivity policy database 140 that are coupled to each other via a network 120. Network 120 may include one or more local area network (LAN), a wide area network (WAN), a 5G network, the Internet, an Infini-Band network, and/or any other suitable type of network. Each of the compliance manager 110 and the databases 130 and 140 may include one or more computing devices, such as the computing device 500, which is discussed further below with respect to FIG. 5. The database 140 may store data sensitivity policies. In the present example, the databases 130 include an online sales database, an offline sales database, a back office booking database, a fulfillment database, and a logistics database.

The databases 130 may store information that is used by different departments of an organization, with each department having its own systems. For example, the offline sales databases may store information that is used by an offline sales system, the online sales database may store information that is used by an online sales system, the back office booking database may store information that is used by a back office booking system, the fulfillment database may store information that is used by a fulfillment system, and the logistics database may store information used by various logistics systems.

The online sales system facilitates product purchases through a website of the organization and the offline sales system facilitates product purchases through brick-and-mortar stores. Both the online and offline sales systems maintain their own databases and store customer information. The back office booking system handles the actual order booking process and other validations related to orders, such as trade compliance checks. The back-office system retrieves customer information from the online and offline sales databases and uses it for further processing. The fulfillment system is responsible for order fulfillment and retrieves customer-related information from the back-office system. The fulfillment system then shares this information with the logistic systems, which require it for customer delivery. Furthermore, customer information and orders can be shared with various downstream systems, including a planning system for backlog calculation, services for managing warranty and support, and data marts for operational analytics. The databases 130 may store various types of sensitive information, such as customer addresses, credit card numbers, or bank account numbers.

Large organizations, such as the organization from the example of FIG. 1, may face several challenges with respect to the information in databases. For example, the sheer volume of data and the multitude of systems it passes through create a complex data flow ecosystem. This complexity makes it difficult to accurately trace and understand all the pathways through which data moves, leading to challenges in ensuring data privacy and compliance.

Adhering to data privacy regulations, such as the General Data Protection Regulation (GDPR), is crucial for the organizations, such as the organization in the example of FIG. 1, which handle sensitive data. However, the intricate data flow within large organizations can make it hard to guarantee compliance at every stage. This poses a risk of non-compliance and potential violations, which can result in legal consequences and damage to the organization's reputation.

Furthermore, protecting sensitive data is a paramount concern for organizations, such as the organization from the example of FIG. 1. Without a comprehensive understanding of data flow pathways, organizations may struggle to implement appropriate security measures like data masking, encryption, and access controls. This lack of control and visibility increases the vulnerability of sensitive data, putting it at higher risk of unauthorized access or disclosure.

Compliance manager 110 provides functionalities that help address the above challenges. For example, compliance manager 110 may help determine that the information stored in a database 130 complies with various data protection regulations and is sufficiently protected against unauthorized access. As is discussed further below, compliance manager 110 offers a comprehensive solution tailored to the management of sensitive data across organizational databases. This solution comprises several integrated components that serve to identify databases, establish data lineage across diverse systems, predict sensitive data occurrences, ensure regulatory compliance, and provide advanced analytics capabilities.

The solution starts by identifying databases (e.g., databases 130) through network scanning using tools like Nmap. It then obtains database connection details (e.g., connection details associated with databases 130) using Troux software or similar solutions, including surveys with owners, to gather essential information.

After successfully identifying the databases, the subsequent step involves scanning the list of tables and attributes present across various databases. This step helps establish data lineage, and it is executed through the utilization of advanced machine learning techniques such as natural language processing (NLP). Establishing data lineage facilitates the ability to view attribute values across multiple systems, validating whether encryption or masking measures are appropriately implemented or not.

The data sensitivity policies, which are stored in database 140, are defined to comply with local laws and regulations. Machine learning techniques are utilized to predict the presence of sensitive data, in accordance with the data sensitivity policies, within tables or columns, improving accuracy through training and validation.

Compliance manager 110 may offer insight into compliance status, generating a score for each database and highlighting areas for improvement. As is discussed further below, compliance manager 110 may provide a comprehensive, efficient, and accurate approach to managing sensitive data within organizational databases, ensuring compliance and enabling informed decision-making.

In one example, compliance manager 110 may utilize a scanning tool, such as NMAP, to discover all the databases within the organization. This step allows compliance manager 110 to identify and obtain information about the databases 130 that are present in system 100. Next, compliance manager 110 may gain access control over databases 130 by leveraging an enterprise application repository, such as Troux or another similar solution. Next, compliance manager 110 leverages advanced machine techniques to establish lineage among tables or columns from various systems. Next, with access to the databases, compliance manager 110 may initiate scans using its machine-learning model, which has been trained on diverse datasets. These scans enable compliance manager 110 to identify and extract sensitive information from databases 130 consistently. By having comprehensive access and utilizing its scanning capabilities, compliance manager 110 may ensure that sensitive information that is stored in databases 130 can be protected throughout the entire organization (or the entire system/network 100 which is used by the organization). This approach mitigates the risk of overlooking any databases and allows for organization-wide data protection. As a result of the scan, compliance manager 110 may identify instances where data is encrypted in one system but not in another, and provide a report to the user indicating which database contains data that is not encrypted, in a possible violation of compliance regulations. For example, when sensitive identical data is discovered without encryption or masking across different systems, compliance manager 110 can activate masking alerts.

Figure 2:
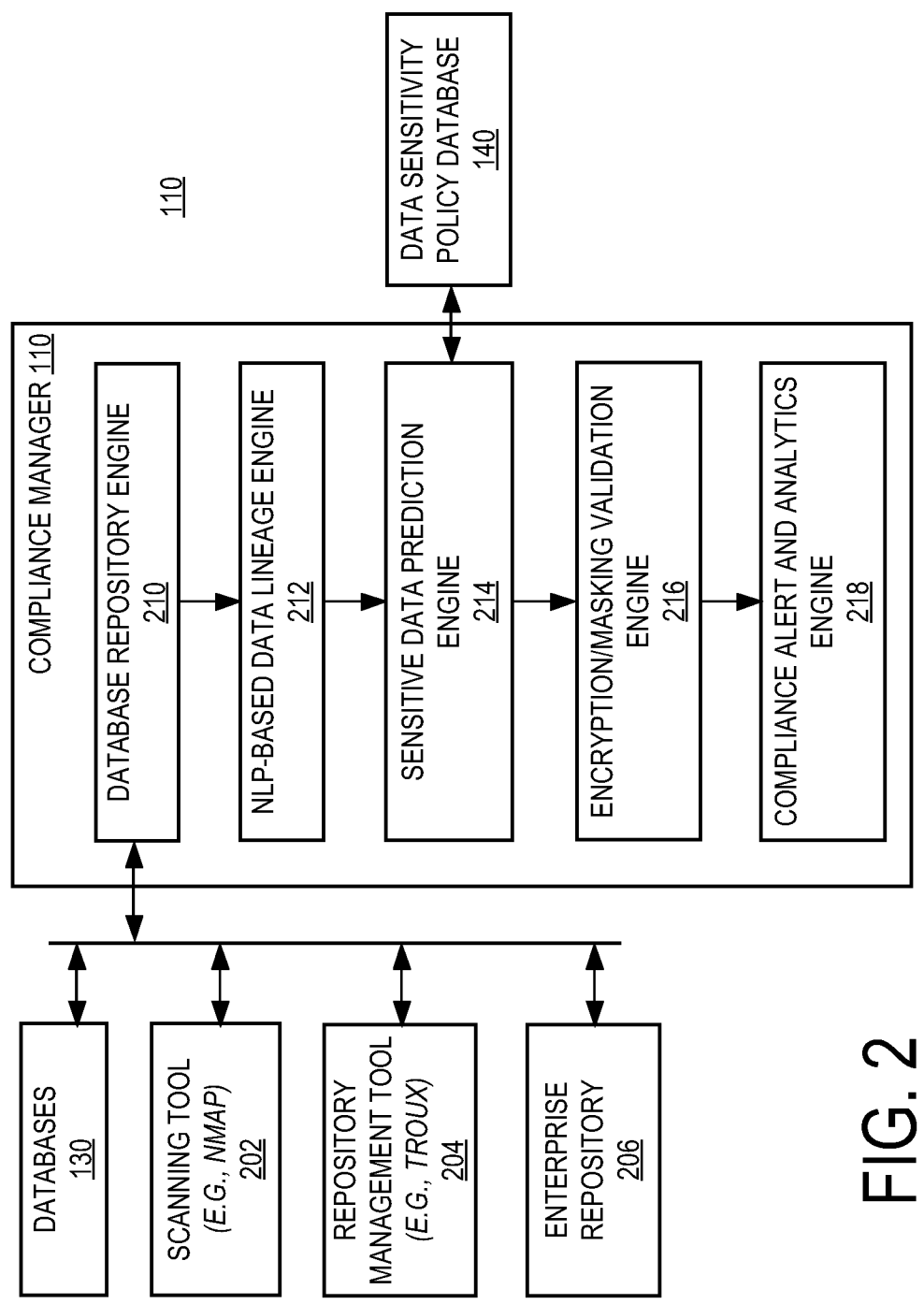
FIG. 2 is a diagram of an example of a compliance manager, according to aspects of the disclosure.

FIG. 2 shows an example of one possible implementation of compliance manager 110, according to aspects of the disclosure. As illustrated, compliance manager 110 may include a data repository engine 210, an NLP-based engine 212, a sensitive data prediction engine 214, an encryption/masking validation engine 216, and a compliance alert and analytics engine 218. According to the present example, each of engines 210 is implemented in software that is executed by one or more processors that are part of compliance manager 110. However, alternative implementations are possible in which any of engines 210-218 is implemented in hardware or as a combination of software and hardware.

In one aspect, engine 210 may be configured to identify a list of databases that are used across an enterprise. More particularly, according to the present example, engine 210 is configured to identify the databases 130. Engine 210 may utilize a scanning tool 202 to discover and identify active databases within system 100. Scanning tool 202 may be configured to scan for open ports commonly used by database servers (such as port 1433 for Microsoft SQL Server or port 3306 for MySQL) and maintain a list of databases running on those servers. In one implementation, scanning tool 202 may be Nmap (Network Mapper). Nmap is an influential and widely used open-source network scanning tool that specializes in identifying hosts and services within a computer network. By leveraging Nmap, engine 210 can gain in-depth insights into network devices, open ports, operating systems, and other valuable data. Any information that is discovered about network devices used to implement databases 130, open ports on any of databases 130, operating systems used to run any of databases 130, as well as any other information that is obtained by scanning tool 202 may be stored in enterprise repository 206.

In another aspect, engine 210 may be configured to identify information for connecting to any of the databases that are identified using scanning tool 202. The information may be identified using repository management tool 204. Tool 204 may be the Troux™ software, and or a comparable solution for administering applications, databases, and infrastructure across an entire organization. The information obtained by engine 210 gives compliance manager 110 the ability to access multiple such repositories as needed, ensuring that it has accurate and complete information about the diverse databases 130 that are used throughout system 100. In some implementations, instead of (or in addition to) using tool 204, engine 210 may provide a user interface that allows the user to manually enter information about databases and their owner's information. The manually-entered information may be obtained by the user by conducting surveys with the owners of databases 130 to gather essential information such as database credentials, usage details, and the purpose of the databases. Additionally, engine 210 may provide a vault (not shown) where the collected database credentials can be securely maintained. In other words, engine 210 may ensure that necessary information for accessing databases 130 is obtained and securely stored for future use by one or more of engines 212-218.

Engine 212 may perform data lineage identification. In one example, engine 212 may implement a machine-learning model for data lineage based on table names, attribute names, and data within the table involves a complex task that combines natural language processing (NLP) for understanding table and attribute names, as well as data processing techniques to capture relationships between tables and their data. The machine learning model may identify data objects that bear a relationship with each other and thus belong in the same data category.

In one aspect, engine 212 may be configured to perform data collection and preparation. For example, to train a neural network or another machine-learning model, engine 212 may collect a diverse dataset consisting of instances of table names, attribute names, and sample data entries from repository 206. Afterwards, engine 212 may annotate the dataset with ground truth data lineage information, which includes relationships between tables and their attributes. In other words, the data set may include a plurality of table identifiers, wherein each table identifier corresponds to a table stored in one of the databases identified by engine 212 (e.g., databases 130). Furthermore, for each table (or table identifier), the data set may identify one or more attributes corresponding to the table as well as other tables that have an established relationship with the former table. As noted above, two tables may be related (i.e., have an established relationship), when they store the same information or when they store information that is complementary. By way of example, two information items may be considered complementary if they are received as a result of the same transaction, if they are input into system 100 using the same electronic form (e.g., a retail website form; or a form in a system for managing offline orders), or if they are used to accomplish the same task.

By way of example, two tables may be related if they include one or more of: (i) the same data, (ii) data that is obtained at the same time or input with the same web form, (iii) data that is obtained as part of the same type of transaction (iv) data that is used to accomplished used to accomplish the same task (e.g., to complete the shipping of a product or to complete payment for the product), and/or (iv) data that is used by the same component of the same system. In this regard, the annotations and labels for a training data set that is generated by engine may selected in such a way as to indicate that data objects that are related belong in the same data category. In some implementations, the annotations may be received as user input by engine 212. However, the present disclosure is not limited to any specific method for generating the annotations. For example, in some implementations, the annotations may be generated automatically by engine 212.

In another aspect, engine 212 may perform pre-processing, data parsing, and feature extraction on the collected dataset. The pre-processing tokenization, stemming, and removal of stop words. The feature extraction may include converting the pre-processed text into numerical features using methods like TF-IDF (Term Frequency-Inverse Document Frequency) or word embeddings (Word2Vec, GloVe) to capture semantic similarities. After the data set is pre-processed, engine 212 may parse the pre-processed data set. For example, engine 212 may extract structured information from the data set by using regular expressions, named entity recognition (NER), or more advanced techniques like spaCy. As a result of the feature extraction, engine 212 may generate a plurality of signatures. Each of the signatures may correspond to a different data object. For example, a signature may correspond to a given entire table, in which case the signature would be representative of the given table, but not of other tables that are part of the same database as the given table. As another example, a signature may correspond only to a given column (or row) in a table, in which case the signature would be representative of the given column (or row), but not of other columns or rows that are part of the same table as the given row. As another example, a signature may correspond only to a given table entry, in which case the signature would representative of the given column (or row), but not of other entries in the same table.

In another aspect, engine 212 may implement a machine-learning model for classifying the generated signatures. The machine-learning model may be a neural network that combines processed table and attribute name features with extracted data features. The neural network may incorporate attention mechanisms to focus relevant parts of the data for establishing relationships. In some implementations, any suitable type of neural network may be used that is capable of finding the topic of text or determining other aspects of the semantic content of the text. The design of such neural networks is well understood, and it will be clear to those of ordinary skill in the art, after reading the present disclosure, how to implement the neural network.

The neural network may be trained using the dataset that is annotated with the ground truth lineage information. Additionally or alternatively, the neural network's output may be the predicted lineage relationships between tables, attributes, and data. In some implementations, the neural network may be configured to receive a signature that is generated as discussed above and classify it into one or more data categories (i.e., determine which category the signature belongs in, if any). In some implementations, the neural network may be a topic classification network, and it may have any architecture that is common for topic classification networks. For example, the neural network may be a recurrent neural network (RNN), long short-term memory network (LS™), generative pre-trained transformer (GPT) neural network, or bidirectional encoder representations from transformers (BERT) neural network.

Engine 214 may be configured to define data sensitivity policies and store the data sensitivity policies in database 140. The data sensitivity policies can be tailored to specific geographies or countries to ensure compliance with local laws, regulations, and cultural norms. These policies define the handling, protection, and storage requirements for sensitive data based on the specific legal and privacy standards of each jurisdiction. They outline the types of data considered sensitive, specify encryption and security measures, establish access controls, and provide procedures for reporting and managing data breaches. By aligning data sensitivity policies with specific geographies or countries, organizations can demonstrate their commitment to protecting sensitive information in a manner that respects regional regulations and addresses the unique privacy concerns of individuals and governing authorities. In some implementations, a data protection policy may be an alphanumerical string or an expression that includes an identifier sensitivity type, and optionally one or more other data object characteristics, and specifies one or more of encryption measures and security measures that need to be implemented for data objects having the same sensitivity type which possess the characteristics provided by the expression (if such characteristics are at all provided). In addition, a data protection policy may include an identifier of a document (or database entry) that contains a list of security measures in the event the security of the data object is compromised. The security measures indicated by the data protection policy may identify one or more databases where the data object is permitted to be stored, one or more users or user groups that are allowed to access the data object. The encryption measures indicated by a data sensitivity policy may indicate whether the data object needs to be encrypted (or masked), the type of encryption that can be used (e.g., symmetric key encryption, symmetric key encryption, hash function, etc.). The encryption measures indicated by a data sensitivity policy may indicate the minimum length of the encryption key that is used to encrypt the data object.

In some implementations, engine 214 may implement a machine-learning model, such as a neural network, for identifying the type of a data object. The machine-learning model implemented by engine 214 is different from the machine-learning model implemented by engine 212 in that identifies the sensitivity type of a data object, whereas the machine-learning model implemented by engine 212 determines whether two data objects are related or belong to a specific data class. Examples of data classes include customer information, supplier information, product information, etc. Examples of sensitivity types are "Personally Identifiable Information (PII)" and "Payment Card Industry (PCI) data". As a non-limiting example, PII may include social security numbers, tax IDs, driver licence numbers or other similar information. As a non-limiting example, PCI may include credit card numbers, bank account numbers or other similar information.

In some implementations, engine 214 may generate a signature for a data object that is classified with the machine-learning model. The signature may identify one or more statistical properties or patterns associated with the object, data types that are associated with the data object, and/or any other suitable information. As noted above, the data objects that are classified by the machine-learning model may be different data tables or columns that are stored in databases 130. In some implementations, the machine-learning model that is utilized by engine 214 may be generated by performing the following steps:

Data Collection: Gather a diverse and representative dataset that includes both sensitive and non-sensitive data. This dataset should encompass a variety of data tables and their associated columns.

Data Annotation: Annotate the dataset, labeling the tables and columns that contain sensitive data as positive examples and those without sensitive data as negative examples. This step requires domain knowledge and expertise in identifying sensitive data types.

Feature Extraction: Extract relevant features from the tables and columns in the dataset. These features can include data types, statistical properties, patterns, and any other characteristics that may distinguish sensitive from non-sensitive data.

Model Training: Utilize machine learning algorithms such as classification or anomaly detection to train a model on the annotated dataset. The model learns patterns and relationships between the extracted features and the presence of sensitive data.

Model Evaluation: Assess the performance of the trained model using evaluation metrics such as precision, recall, and F1-score. Fine-tune the model if necessary to improve its accuracy.

Predictions: Apply the trained model to new data tables or columns to predict the likelihood of containing sensitive data. The model will assign a probability or classification label indicating the presence or absence of sensitive information.

Post-processing and Validation: Review and validate the model's predictions, considering any false positives or false negatives. Adjust thresholds or refine the model as needed to optimize its performance.

Engine 216 may be configured to determine whether a data object is encrypted or masked. According to the present example, the objects that are classified by engine 216 are columns. In this regard, a data object may be considered encrypted or masked as a whole, or if individual entries in the data object are encrypted or masked. An item is considered masked if one or more characters in the data object are replaced with a predetermined number. For example, a credit number may be masked by replacing the first 12 digits of it with the star symbol (e.g., *  ** 3434). When a data item is masked, some characters in the data item are thrown away and replaced by others, such that the information that is represented by the thrown-out characters is lost, and the data item can no longer be reconstituted. By contrast, when a data item is encrypted, the data item may be capable of being reconstituted back to its original state.

In some implementations, engine 216 may implement a neural network that receives a signature as input and determines whether a data object corresponding to the signature is encrypted or masked. The signature may indicate statistical properties of the object (mean, variance, etc.), the presence of specific characters or character patterns that are indicative of masking, and/or textual characteristics, such as length, word count, etc. In some implementations, the machine-learning model that is utilized by engine 216 may be generated by performing the following steps:

Data Collection and Preparation:

Gather a dataset containing examples of columns with masked data and columns with unmasked data. These examples can come from various tables and sources that we have identified in earlier sections.

Each entry in the dataset should include the column data, a label indicating whether it's masked or not (1 for masked, 0 for unmasked).

Feature Extraction:

Extract features from the column data that can help the model distinguish between masked and unmasked data. Features might include:

Statistical properties (mean, variance, etc.).

Presence of specific characters or patterns indicative of masking.

Textual characteristics (length, word count, etc.).

Model Selection and Training:

Choose a classification algorithm such as decision trees, random forests, support vector machines, or neural networks.

Split the dataset into training and testing sets.

Train the model using the labeled training data, with the goal of learning the patterns that differentiate masked from unmasked data.

Model Evaluation:

Evaluate the model's performance on the testing set using appropriate metrics (accuracy, precision, recall, F1-score, etc.).

Adjust hyperparameters and model architecture as needed to improve performance.

Deployment and Inference:

Deploy the trained model into a validation process.

As new column data is encountered, use the model to predict whether the data is masked or not.

Continuous Improvement:

Continuously monitor the model's performance and gather feedback from real-world scenarios.

Refine the model periodically based on new data and any changes in masking patterns.

Engine 218 may be configured to validate sensitive data and evaluate whether encryption or masking measures have been consistently applied across all databases 130. If these measures are found to be absent, the component will promptly alert the users. Engine 218 may offer comprehensive insights into the compliance status of all databases operating within the enterprise. It provides a compliance score for each database and identifies areas where compliance requirements are met effectively and areas where improvements are needed. The generated report is accessible to both database owners and higher-level leadership, enabling them to have a clear understanding of the compliance posture across the organization's databases. In some implementations, engine 218 may determine whether any of the columns that are identified by engine 212 comply with the sensitivity policies in database 140. Specifically, engine 218 may determine the sensitivity type of each column, retrieve from database 140 one or more sensitivity policies for the identified sensitivity type, determine whether the column needs to be encrypted or masked according to the policies, and determine whether the column is actually encrypted or masked, and output an alert if the policies require the column to be encrypted or masked and the column is not encrypted or masked.

Figure 3:
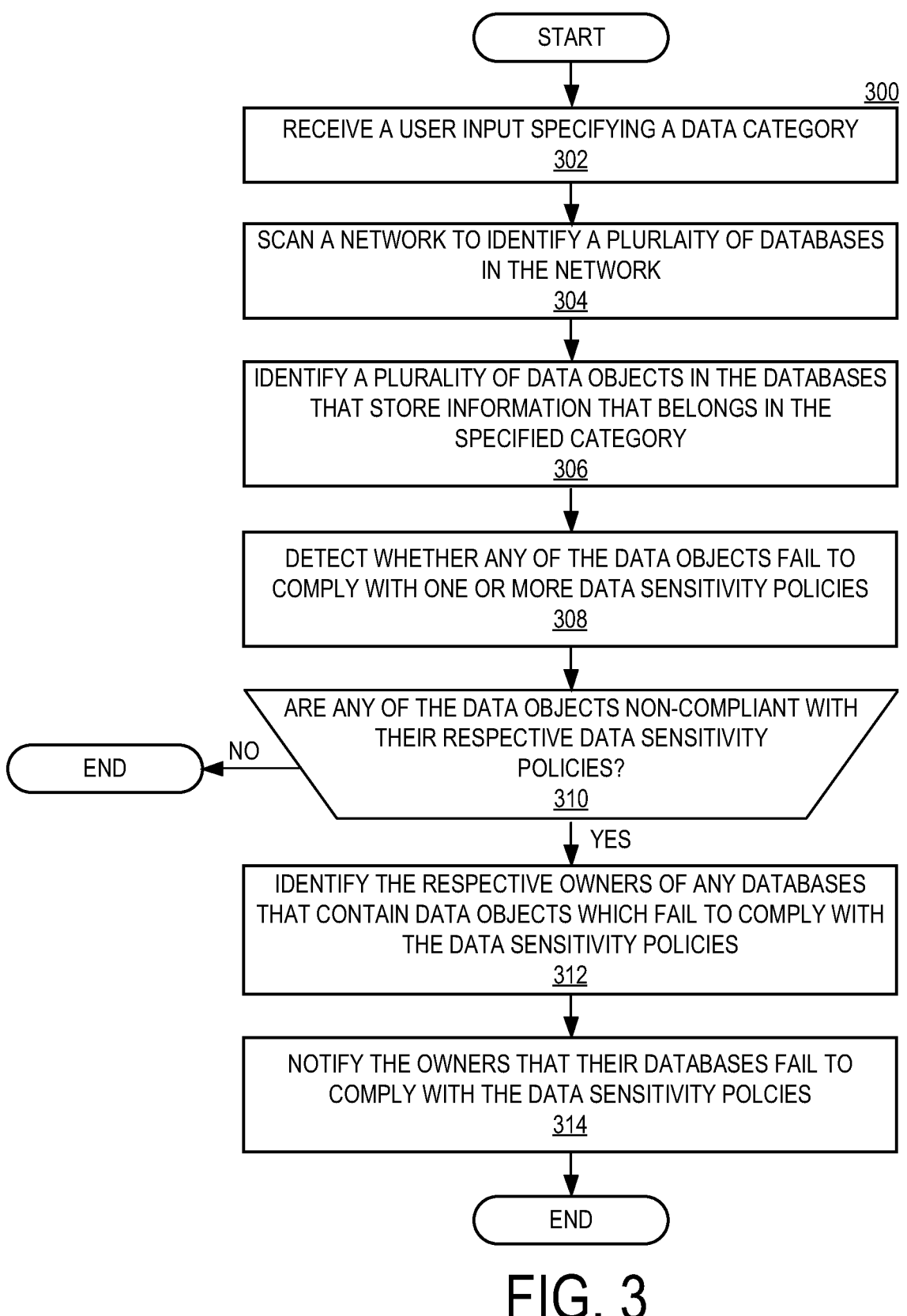
FIG. 3 is a flowchart of an example of a process, according to aspects of the disclosure.

FIG. 3 is a flowchart of an example of a process 300, according to aspects of the disclosure.

At step 302, compliance manager 110 receives a user input specifying a data category. By way of example the data category may be one of "customer information", "employee information", "supplier information", "research and development information", "accounting information", and/or any other suitable type of information. The user input may be received over via a keyboard, a mouse, a communications network, and/or in any other suitable manner.

At step 304, compliance manager 110 identifies one or more databases in an enterprise network (or system). According to the present example, compliance manager uses engine 210 to scan system 100 and identify the databases 130 as a result of the scan.

At step 306, compliance manager 110 identifies a plurality of data objects that store information that belongs in the identified category. According to the present example, the identified objects are data tables that are stored in any of databases 130. However, alternative implementations are possible in which at least some (or all) of the identified objects are table columns that are stored in any of databases 130, or another type of object. In some implementations, the data objects may be identified by executing a process 400A, which is discussed further below with respect to FIG. 4A.

As used herein, the term "data table" may refer to a structured collection of data that is organized in rows and columns. Each row may represent a unique record or data instance, whereas the columns may identify the different attributes or properties that are associated with the records in the table. Each table may have a table name, which may be a unique identifier that could be used to identify the table among all other tables that are stored in the same database. In some implementations, a table may have a primary key column that unique identifies rows in the table. Optionally, some tables may include a foreign key column that refers to the primary key(s) of another table and is used to establish relationships between tables.

At step 308, compliance manager 110 detects whether any of the identified data objects fails to comply with one or more data sensitivity policies that are associated with that object. In some implementations, step 308 may be performed by executing a process 400B, which is discussed further below with respect to FIG. 4B.

At step 310, compliance manager 110 determines whether any of the data objects have been found non-compliant with their respective data sensitivity policies. If any of the data objects have been found to be non-compliant, process 300 proceeds to step 312. Otherwise, process 300 ends.

At step 312, the compliance manager 110 identifies the respective owner of any of the databases (identified at step 304) that contain data objects that have been determined to be non-compliant with their associated data sensitivity policies. The owner of a database, may be a system administrator, a head of department that fields and uses the database, a data protection officer, and/or any other person of authority over the database. In some implementations, the owner of the database may be identified by using a database repository engine 210 (shown in FIG. 2). In some implementations, identifying the owner may include identifying an email address of the owner or identifying the telephone number of the owner. In some implementations, the owner of a database may be identified by searching a company directory (e.g., stored in the memory of compliance manager 110 or stored remotely) that identifies the respective owners of databases 130.

At step 314, the compliance manager 110 transmits a notification (i.e., an alert) to each one of the respective owners (identified at step 312), indicating that a database that is owned by the owner contains an object that has failed one or more data sensitivity policies. The notification may be transmitted via email, text message (e.g., a short message service (SMS) message), and/or in any other suitable manner. The notification may include an identifier of the database, an identifier of the data object, and an identifier of one or more data sensitivity policies that are not complied with by the data object.

In some implementations, compliance manager 110 may display a list of data objects that have failed to comply with their respective sensitivity policies on a display screen of compliance manager 110. The list may include an identifier of each data object that has been found to be non-compliant, as well as identifiers of one or more policies that the object has failed to comply with, and an identifier of the database where the data object is stored.

FIG. 4A is a flowchart of an example of a process 400A for identifying one or more data objects that store information that belongs in a user-specified category, according to aspects of the disclosure.

At step 402, engine 212 identifies a plurality of data objects that are stored in the databases identified at step 304 (see FIG. 3). According to the present example, each of the identified objects is a different table that is stored in the databases. However, alternative implementations are possible in which at least some (or all) of the identified objects are table columns and/or any other suitable type of data object.

At step 404, for each of the data objects (identified at step 402), engine 212 identifies metadata that is associated with the object. Examples of metadata that is associated with a table (or individual columns within a table) include: the name of the table, one or more column names which belong to columns in the table, the respective data types of one or more columns in the table, constraints associated with the table, information about indexes created on the table to optimize data retrieval, primary key(s), foreign key(s), table size, creation and modification dates.

At step 406, for each of the data objects (identified at step 402), engine 212 may retrieve data that is stored in the object. In instances in which the data object is a table, engine 212 may retrieve one or more attributes or fields of the table (e.g., words or numbers that are stored in the table).

At step 408, engine 212 generates a different respective signature for each of the data objects based on the metadata that is associated with the metadata object and the data that is stored in the data object. In some implementations, the metadata and data that are associated with a given data object may be treated as a body of text, and the signature may be generated using word2vec or text2vec, GloVe (Global Vectors for Word Representation), or BERT (Bidirectional Encoder Representation and/or any other suitable technique that is used in natural language processing (NLP). When the signature is generated by using such techniques the signature may include word embeddings. The term "word embedding" as used herein refers to a numerical representation of a word in a vector space.

At step 410, engine 212 classifies the respective signature of each of the data objects with a neural network to determine whether the data stored in the data object belongs in a user specified category, such as the category received at step 302 (see FIG. 3). In some implementations, the neural network may be of the type that is customarily used in natural language processing (NLP) to perform semantic analysis on text and/or determine the top or subject of text. As discussed above, the neural network may be one that is specifically trained to classify data object signatures into one or more data categories.

It is well known in the field of computer security that sensitive data (e.g., data that is supposed to be encrypted) may linger in plaintext in various databases that exist in an enterprise network, such as databases used in software testing and development or databases used in accounting for example. According to aspects of the disclosure, it has been determined that taking a neural network that is customarily used for natural language processing, and training the neural network based on a training data set that reflects the relationship between data, and which uses signatures based on word embedding, enables the neural network to effectively classify data objects into data categories. This is advantageous because it permits compliance manager 110 to effectively uncover sensitive data that is stored in unexpected places, and verify whether the data is stored in a way that is compliant with various data protection rules and regulations.

FIG. 4B is a flowchart of an example of a process 400B for detecting whether a data object contains data that fails to comply with one or more data sensitivity policies, as specified by step 308 of process 300.

At step 412, engine 214 generates one or more first signatures for the data objects. The one or more first signatures may be generated as discussed above with respect to FIG. 2. According to the present example, the data object is a table, and a single first signature is generated for the entire table. However, alternative implementations are possible in which a different first signature is generated for each column in the table. Although, in the present example, the data object is a table, alternative implementations are possible in which the data object is a table column and/or any other suitable type of data object.

At step 414, engine 214 identifies the respective sensitivity type that is associated with each of the first signatures. The sensitivity type for each first signature may be determined by classifying the first signature in the manner discussed above with respect to FIG. 2. As used herein, the phrase "sensitivity type associated with a first signature" refers to the sensitivity type of data that is stored in the object (or object portion) that is used as a basis for generating the first signature.

At step 416, engine 216 retrieves from database 140 one or more data sensitivity policies that correspond to the sensitivity types (identified at step 414). For example, for each sensitivity type (other than public or unrestricted), engine 216 may retrieve one or more data sensitivity policies that are associated with the that type. In one example, the data sensitivity policy that is associated with a sensitivity type may specify whether data of that sensitivity type is one of: (i) required to be encrypted, (ii) required to be masked, or (iii) allowed to be stored in an unencrypted and unmasked form.

At step 418, engine 216 generates one or more second signatures that are associated with the data object. According to the present example, the data object is a table, and a different second signature is generated for each column in the table. However, when the object is a column, only one second signature may be generated. The second signature may be generated as discussed above with respect to FIG. 2.

At step 420, engine 216 detects whether data associated with each of the signatures is encrypted or masked. Specifically, engine 216 classifies each of the signatures as discussed above with respect to FIG. 2. In some implementations, the outcome of the classification of any given signature may indicate that the data associated with the given signature is encrypted, masked, or neither encrypted or masked.

At step 422, engine 218 detects whether each of the data sensitivity policies (identified at step 416) complied with. For example, engine 218 may identify the data that is used as a basis for generating any given one of the first signatures, and determine the sensitivity type of the data. Next, engine 218 may identify one or more second signatures that are generated based on the same data as the given first signature, after which engine 218 may determine whether the encryption/masking classification of any of the second signatures matches the encryption/masking state that is prescribed by the data sensitivity policies.

Consider an example in which: the given first signature is classified as a first sensitivity type, the one or more sensitivity policies provide that data having the first sensitivity type needs to be encrypted, and at least one of the second signatures (that are generated based on the same data as the given first signature) is classified in one of the "masked" or "neither encrypted nor masked" categories. In this case, engine 212 may detect that the one or more sensitivity policies are violated by the data object (or object portion) that is used to generate the given first signature. Consider another example in which: the given first signature is classified as a first sensitivity type, the one or more sensitivity policies provide that data having the first sensitivity type needs to be encrypted, and each of the second signatures (that are generated based on the same data as the given first signature) is classified in the "encrypted" category. In this case, engine 212 may detect that the one or more sensitivity policies are complied with by the data object (or object portion) that is used to generate the given first signature.

Figure 5:
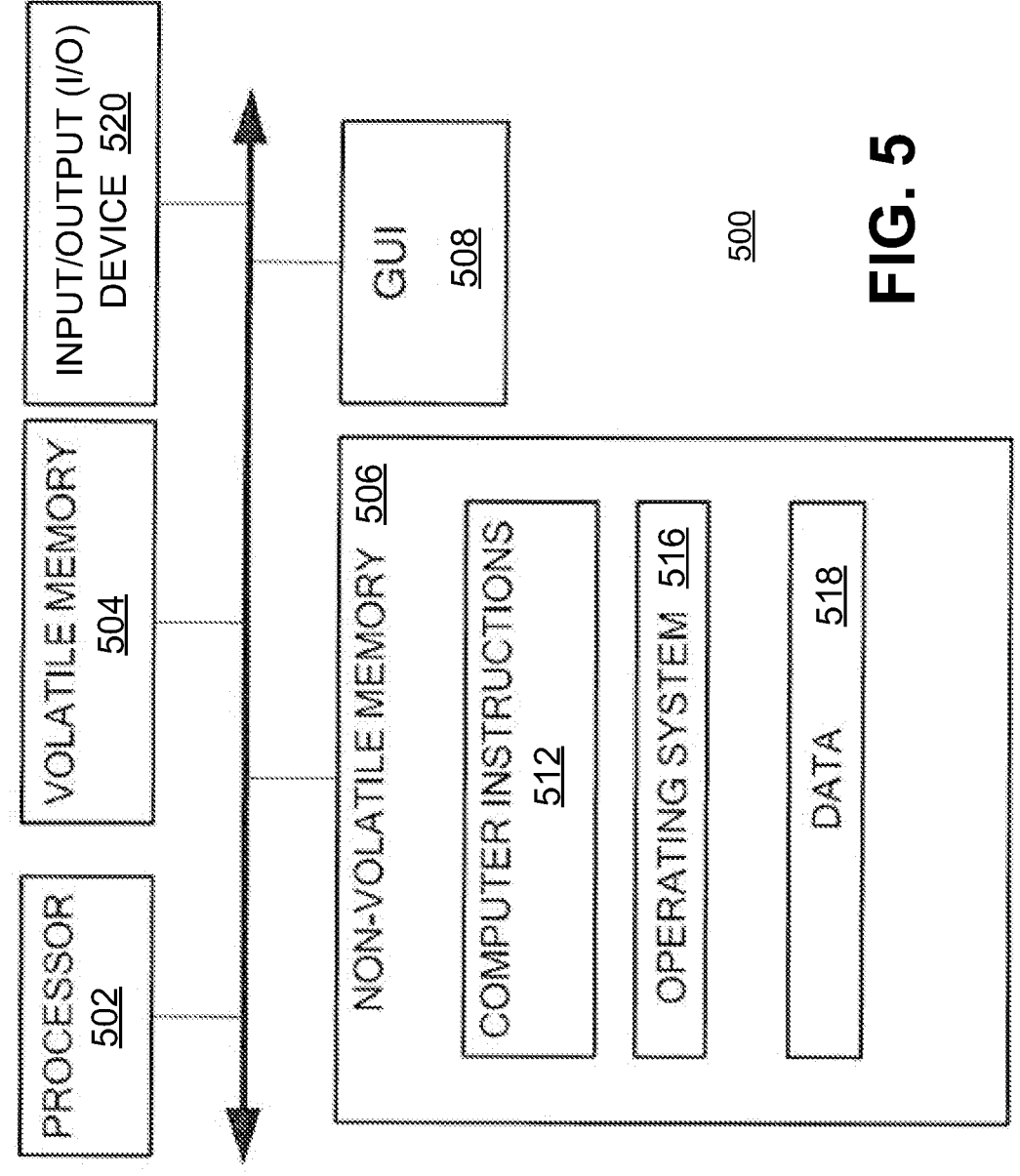
FIG. 5 is a diagram of an example of a computing device, according to aspects of the disclosure.

Referring to FIG. 5, in some embodiments, a device 500 may include processor 502, volatile memory 504 (e.g., RAM), non-volatile memory 506 (e.g., a hard disk drive, a solid-state drive such as a flash drive, a hybrid magnetic and solid-state drive, etc.), graphical user interface (GUI) 508 (e.g., a touchscreen, a display, and so forth) and input/output (I/O) device 520 (e.g., a mouse, a keyboard, etc.). Non-volatile memory 506 stores computer instructions 512, an operating system 516 and data 518 such that, for example, the computer instructions 512 are executed by the processor 502 out of volatile memory 504. Program code may be applied to data entered using an input device of GUI 508 or received from I/O device 520.

FIGS. 1-5 are provided as an example only. In some embodiments, the term "I/O request" or simply "I/O" may be used to refer to an input or output request. In some embodiments, an I/O request may refer to a data read or write request. At least some of the steps discussed with respect to FIGS. 1-5 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. The "phrase generating an alert" may refer to any suitable action that would bring attention to the fact that a data object is not stored in a way that is compliant with a data sensitivity policy that pertains to the data object. For example, generating an alert may include transmitting a notification to a database owner, displaying a message on a display screen of a device, adding an entry to a database indicating that the way in which the data object is stored needs to be correct, and/or otherwise flagging the data object.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method, comprising:

receiving a user input specifying a data category;

performing a search of a network to identify a plurality of databases in the network;

identifying a plurality of data objects that are stored in the plurality of databases;

generating a different respective first-signature for each of the plurality of data objects;

classifying the respective first-signature for each of the plurality of data objects with a neural network, and identifying, as a result of the classifying, those of the plurality of data objects that contain data that falls into the data category;

detecting whether each of the data objects, which contain data that falls in the data category, complies with one or more data sensitivity policies; and generating an alert for any of data objects that contain data that falls into the data category, but fail to comply with the data sensitivity policies, wherein the respective signature for each of the plurality of data objects contains word embeddings that are ted based on metadata that is associated with the data object.

2. The method of claim 1, wherein each of the plurality of data objects is a database table in a respective one of the plurality of databases, and the respective signature for any of the plurality of data objects is generated further based on the data object and data that is stored in the data object.

3. The method of claim 2, wherein the metadata used to generate the respective signature of any of the plurality of data objects includes a table name.

4. The method of claim 1, wherein each of the plurality of data objects is a table column, the respective signature for any of the plurality of data objects is generated further based on the data object and data that is stored in the data object, and the metadata used to generate the respective signature of any of the plurality of data objects includes a column name.

5. A method, comprising:

receiving a user input specifying a data category;

performing a search of a network to identify a plurality of databases in the network;

identifying a plurality of data objects that are stored in the plurality of databases;

generating a different respective first signature for each of the plurality of data objects;

classifying the respective first signature for each of the plurality of data objects with a neural network, and identifying, as a result of the classifying, those of the plurality of data objects that contain data that falls into the data category;

detecting whether each of the data objects, which contain data that falls in the data category, complies with one or more data sensitivity policies; and generating an alert for any of data objects that contain data that falls into the data category, but fail to comply with the data sensitivity policies wherein the respective signature for each of the plurality of data objects is classified by using a topic classification neural network.

6. A method comprising:

receiving a user input specifying a data category;

performing a search of a network to identify a plurality of databases in the network;

identifying a plurality of data objects that are stored in the plurality of databases;

generating a different respective first signature for each of the plurality of data objects;

classifying the respective first signature for each of the plurality of data objects with a neural network and identifying, as a result of the classifying, those of the plurality of data objects that contain data that falls into the data category;

detecting whether each of the data objects, which contain data that falls in the data category, complies with one or more data sensitivity policies; and generating an alert for any of data objects that contain data that falls into the data category, but fail to comply with the data sensitivity policies, wherein detecting whether any given one of the data objects that contain data, which falls in the data category, complies with one or more data sensitivity policies includes: generating a second signature that is associated with the given data object; classifying the second signature to determine a sensitivity type of data that is stored in the given data object; identifying a sensitivity policy that is associated with the sensitivity type, the sensitivity policy indicating whether the data that is stored in the given data object needs to be encrypted or masked; and processing the given data object to detect whether the given data object is encrypted or masked and detecting whether the given data object is compliant with the sensitivity policy based on an outcome of the processing.

7. A system, comprising:

a memory; and at least one processor that is operatively coupled to the memory, the at least one processor being configured to perform the operations of:

receiving a user input specifying a data category;

performing a search of a network to identify a plurality of databases in the network;

identifying a plurality of data objects that are stored in the plurality of databases;

generating a different respective first signature for each of the plurality of data objects;

classifying the respective first signature for each of the plurality of data objects with a neural network, and identifying, as a result of the classifying, those of the plurality of data objects that contain data that falls into the data category;

detecting whether each of the data objects, which contain data that falls in the data category, complies with one or more data sensitivity policies; and generating an alert for any of data objects that contain data that falls into the data category, but fail to comply with the data sensitivity policies, wherein each of the plurality of data objects is a database table in a respective one of the plurality, of databases, and the respective first signature for any of the plurality of data objects is generated based on both metadata that is associated with the data object and data that is stored in the data object.

8. The system of claim 7, wherein the metadata used to generate the respective first signature of any of the plurality of data objects includes a table name.

9. The system of claim 7, wherein the respective first signature for each of the plurality of data objects is classified by using a topic classification neural network.

10. The system of claim 7, wherein detecting whether any given one of the data objects that contain data, which falls in the data category, complies with one or more data sensitivity policies includes:

generating a second signature that is associated with the given data object;

classifying the second signature to determine a sensitivity type of data that is stored in the given data object;

identifying a sensitivity policy that is associated with the sensitivity type, the sensitivity policy indicating whether the data that is stored in the given data object needs to be encrypted or masked; and processing the given data object to detect whether the given data object is encrypted or masked and detecting whether the given data object is compliant with the sensitivity policy based on an outcome of the processing.

* * * * *